(12) United States Patent
Samuel et al.

(10) Patent No.: US 11,669,618 B2
(45) Date of Patent: Jun. 6, 2023

(54) SYSTEMS AND METHODS FOR SECURING AND LOADING BIOS DRIVERS AND DEPENDENCIES IN A PREDEFINED AND MEASURED LOAD ORDER

(71) Applicant: Dell Products L.P., Round Rock, TX (US)

(72) Inventors: Balasingh P. Samuel, Round Rock, TX (US); Richard M. Tonry, Austin, TX (US); Jonathan D. Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/236,399

(22) Filed: Apr. 21, 2021

(65) Prior Publication Data

US 2022/0342994 A1 Oct. 27, 2022

(51) Int. Cl.
G06F 21/57 (2013.01)
G06F 9/4401 (2018.01)
H04L 9/32 (2006.01)
G06F 9/445 (2018.01)
G06F 11/14 (2006.01)
G06F 21/64 (2013.01)

(52) U.S. Cl.
CPC .......... G06F 21/572 (2013.01); G06F 9/4401 (2013.01); G06F 9/44505 (2013.01); H04L 9/3236 (2013.01); G06F 11/1417 (2013.01); G06F 21/57 (2013.01); G06F 21/575 (2013.01); G06F 21/64 (2013.01); G06F 2221/033 (2013.01)

(58) Field of Classification Search
CPC ...... G06F 9/4401; G06F 21/575; G06F 21/57; G06F 11/1417; G06F 21/64; G06F 21/572; G06F 9/44505; G06F 2221/033; H04L 9/3236
USPC ....................................... 713/2, 187; 726/26
See application file for complete search history.

(56) References Cited

U.S. PATENT DOCUMENTS

| | | | | |
|---|---|---|---|---|
| 8,321,656 | B2* | 11/2012 | Jones | G06F 9/4411 718/108 |
| 10,776,488 | B2* | 9/2020 | Samuel | G06F 9/4401 |
| 2004/0103347 | A1* | 5/2004 | Sneed | G06F 11/1433 714/E11.135 |
| 2008/0256527 | A1* | 10/2008 | Lee | G06F 21/572 717/168 |

(Continued)

*Primary Examiner* — Ji H Bae
(74) *Attorney, Agent, or Firm* — Jackson Walker L.L.P.

(57) ABSTRACT

An information handling system may include a processor and a basic input/output system (BIOS) comprising a program of instructions comprising boot firmware configured to be the first code executed by the processor when the information handling system is booted or powered on, the BIOS configured to, during boot of the information handling system: (i) read a predefined measurement of an order of loading of BIOS drivers configured to execute during execution of the BIOS, such predefined measurement made during build of the BIOS; (ii) perform a runtime measurement of an order of loading of the BIOS drivers during actual runtime of the information handling system; (iii) compare the predefined measurement to the runtime measurement; and (iv) responsive to a mismatch between the predefined measurement and the runtime measurement, respond with a remedial action.

18 Claims, 4 Drawing Sheets

(56) References Cited

U.S. PATENT DOCUMENTS

| | | | |
|---|---|---|---|
| 2016/0085558 A1* | 3/2016 | Anbazhagan | G06F 8/654 |
| | | | 713/2 |
| 2019/0056925 A1* | 2/2019 | Komano | H04L 41/082 |
| 2019/0317774 A1* | 10/2019 | Raghav | G06F 9/4403 |
| 2021/0232691 A1* | 7/2021 | Bishop | H04L 9/3236 |
| 2021/0373906 A1* | 12/2021 | Pathan | G06F 9/4401 |

* cited by examiner

SYSTEMS AND METHODS FOR SECURING AND LOADING BIOS DRIVERS AND DEPENDENCIES IN A PREDEFINED AND MEASURED LOAD ORDER

TECHNICAL FIELD

The present disclosure relates in general to information handling systems, and more specifically to securing and loading basic input/output system (BIOS) drivers and dependencies in a predefined and measured load order.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may employ a basic input/output system (BIOS). Generally speaking, a BIOS comprises executable code stored on computer-readable media (e.g., flash memory) that executes during a pre-boot phase of the information handling system to configure and initialize hardware of the information handling system in preparation for handing off control of such hardware to an operating system of the information handling system. Loading of BIOS firmware is critical, as it serves as a trusted foundation for the information handling system and operating system.

Existing implementations of BIOS do not specify an order for loading and execution of hardware drivers during BIOS execution. Instead, a BIOS "dispatcher" may load BIOS drivers by iterating/looping through all drivers based on contents of a dependency file. Thus, every BIOS protocol and driver may be loaded in a random order until all relevant requirements and dependencies are satisfied. Such lack of an enforced order for BIOS driver execution may render an information handling system vulnerable to a malicious attack. For example, malicious code may execute to modify dependencies of BIOS drivers to cause potential security drivers to load later during the boot process. Thus, systems and methods to harden security by enforcing a load order for BIOS drivers may be desired.

SUMMARY

In accordance with the teachings of the present disclosure, the disadvantages and problems associated with security vulnerabilities in the loading and execution of BIOS drivers may be reduced or eliminated.

In accordance with embodiments of the present disclosure, an information handling system may include a processor and a basic input/output system (BIOS) comprising a program of instructions comprising boot firmware configured to be the first code executed by the processor when the information handling system is booted or powered on, the BIOS configured to, during boot of the information handling system: (i) read a predefined measurement of an order of loading of BIOS drivers configured to execute during execution of the BIOS, such predefined measurement made during build of the BIOS; (ii) perform a runtime measurement of an order of loading of the BIOS drivers during actual runtime of the information handling system; (iii) compare the predefined measurement to the runtime measurement; and (iv) responsive to a mismatch between the predefined measurement and the runtime measurement, respond with a remedial action.

In accordance with these and other embodiments of the present disclosure, a method may include, in an information handling system comprising a processor and a basic input/output system (BIOS) comprising a program of instructions comprising boot firmware configured to be the first code executed by the processor when the information handling system is booted or powered on, during boot of the information handling system by the BIOS: (i) reading a predefined measurement of an order of loading of BIOS drivers configured to execute during execution of the BIOS, such predefined measurement made during build of the BIOS; (ii) performing a runtime measurement of an order of loading of the BIOS drivers during actual runtime of the information handling system; (iii) comparing the predefined measurement to the runtime measurement; and (iv) responsive to a mismatch between the predefined measurement and the runtime measurement, responding with a remedial action.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a basic input/output system (BIOS) of an information handling system: (i) read a predefined measurement of an order of loading of BIOS drivers configured to execute during execution of the BIOS, such predefined measurement made during build of the BIOS; (ii) perform a runtime measurement of an order of loading of the BIOS drivers during actual runtime of the information handling system; (iii) compare the predefined measurement to the runtime measurement; and (iv) responsive to a mismatch between the predefined measurement and the runtime measurement, respond with a remedial action.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

Figure 1:
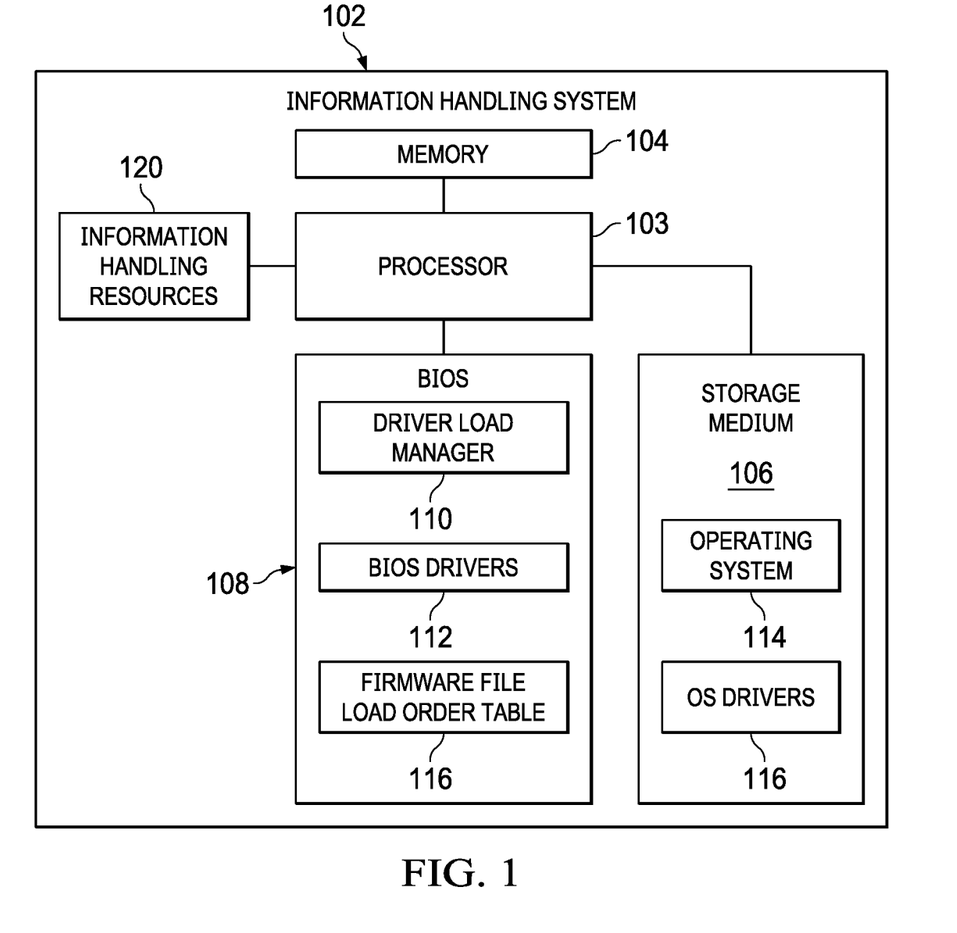
FIG. 1 illustrates a block diagram of an example information handling system, in accordance with certain embodiments of the present disclosure.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a storage medium 106 communicatively coupled to processor 103, a basic input/output system (BIOS) 108 communicatively coupled to processor 103, and one or more other information handling resources 120 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage medium 106, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage medium 106 may be communicatively coupled to processor 104 and may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system 114.

Operating system 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by operating system 114. Active portions of operating system 114 may be transferred to memory 104 for execution by processor 103.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., operating system 114 or other application programs) stored on compatible media (e.g., memory 104, storage medium 106) may be executed by processor 103 and given control of information handling system 102. As shown in FIG. 1, BIOS 108 may include a driver load manager 110, BIOS drivers 112, and a firmware file load order table 116.

As described in greater detail elsewhere in this disclosure, driver load manager 110 may include any system, device, or apparatus configured to, during execution of BIOS 108, enforce loading and execution of BIOS drivers 112 in accordance with a predefined and measured load order set forth in firmware file load order table 116. In some embodiments, driver load manager 110 may be implemented as a program of instructions that may be read by and executed on processor 103 to carry out the functionality of driver load manager 110.

A BIOS driver 112 may comprise a program of instructions configured to, when read and executed by processor 103, provide an interface between BIOS 108 and hardware or firmware executing on an information handling resource 120.

Firmware file load order table 116 may comprise a collection of signed cryptographic hashes that defines an order of loading and execution for BIOS drivers 112, as described in greater detail below.

Generally speaking, information handling resources 120 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, during the build and development process for BIOS 108, an expected load order for BIOS drivers 112 may be captured by storing a list of firmware file system global unique identifiers (GUIDs) in a level-based driver load order list (LDLO). From the LDLO, the build and development process for BIOS 108 may build firmware file load order table 116, wherein each BIOS driver 112 has its own measurement and a specific order of levels of BIOS drivers 112 are established and chained. In firmware file load order table 116, each level may be hashed, and a list of such levels may be hashed again. The hashed list may further be signed with a private key associated with information handling system 102. Firmware file load order table 116 may be securely stored, along with a public key associated with the private key used to sign firmware file load order table 116, in computer-readable media (e.g., non-volatile random access memory, Trusted Platform Module, etc.) integral to or otherwise accessible by BIOS 108.

Subsequently, during execution of BIOS 108, driver load manager 110 may capture the order of loading and execution of BIOS drivers 112, hash such order of loading and execution, and compare such hash to the pre-built signed hash of firmware file load order table 116. Driver load manager 110 may then execute a policy based on the comparison.

Figure 2:
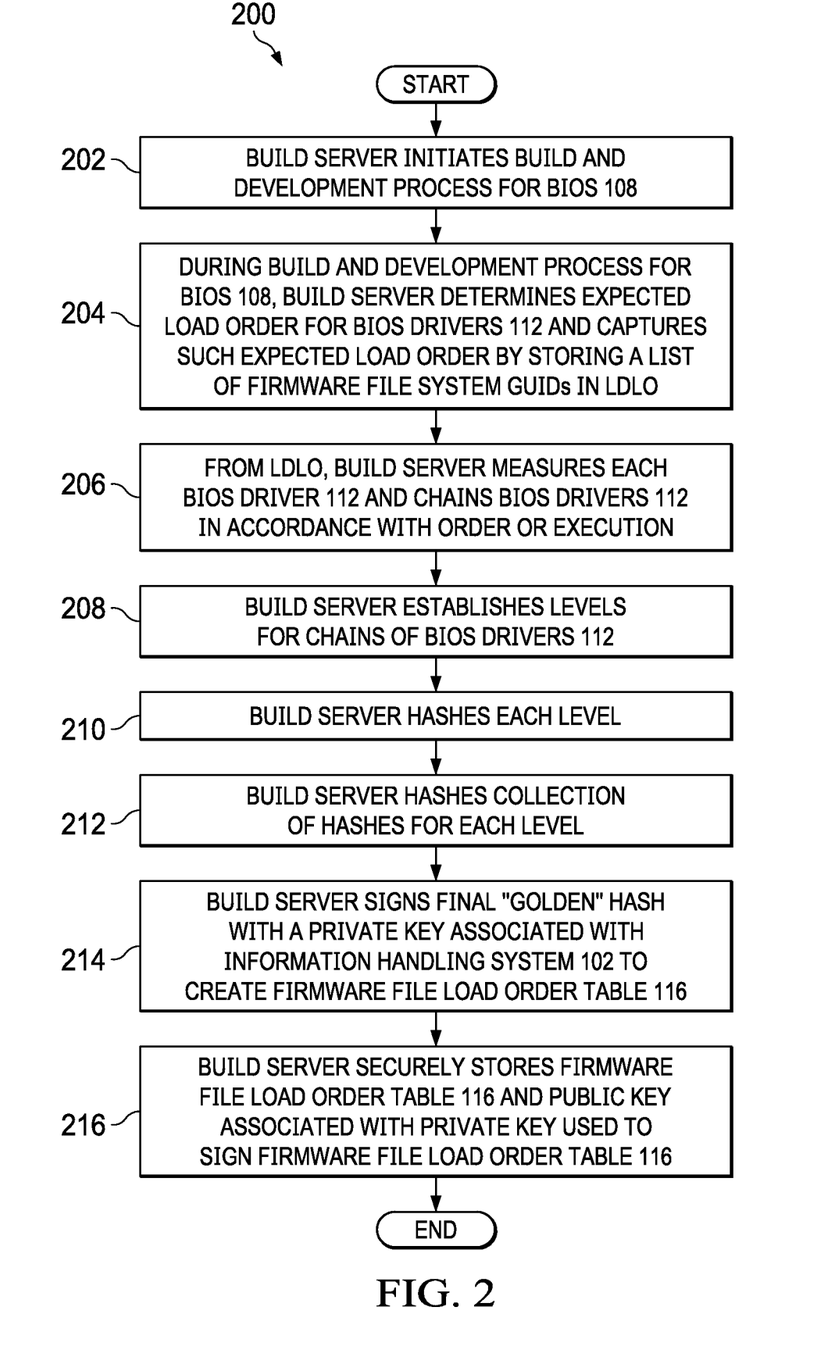
FIG. 2 illustrates a flow chart of an example method for creating a firmware file load order table, in accordance with embodiments of the present disclosure.

FIG. 2 illustrates a flow chart of an example method 200 for creating firmware file load order table 116, in accordance with embodiments of the present disclosure. According to certain embodiments, method 200 may begin at step 202. As noted above, teachings of the present disclosure may be implemented in a variety of configurations of information handling system 102 as shown in FIG. 1. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, a build server may initiate a build and development process for BIOS 108. At step 204, during the build and development process for BIOS 108, the build server may determine an expected load order for BIOS drivers 112 and capture such expected load order by storing a list of firmware file system GUIDs in an LDLO. At step 206, from the LDLO, the build server may measure each BIOS driver 112 and chain BIOS drivers 112 in accordance with order or execution. At step 208, the build server may establish levels for the chains of BIOS drivers 112. Each level may represent a particular phase, step, and/or priority of BIOS 108 execution.

Figure 3:
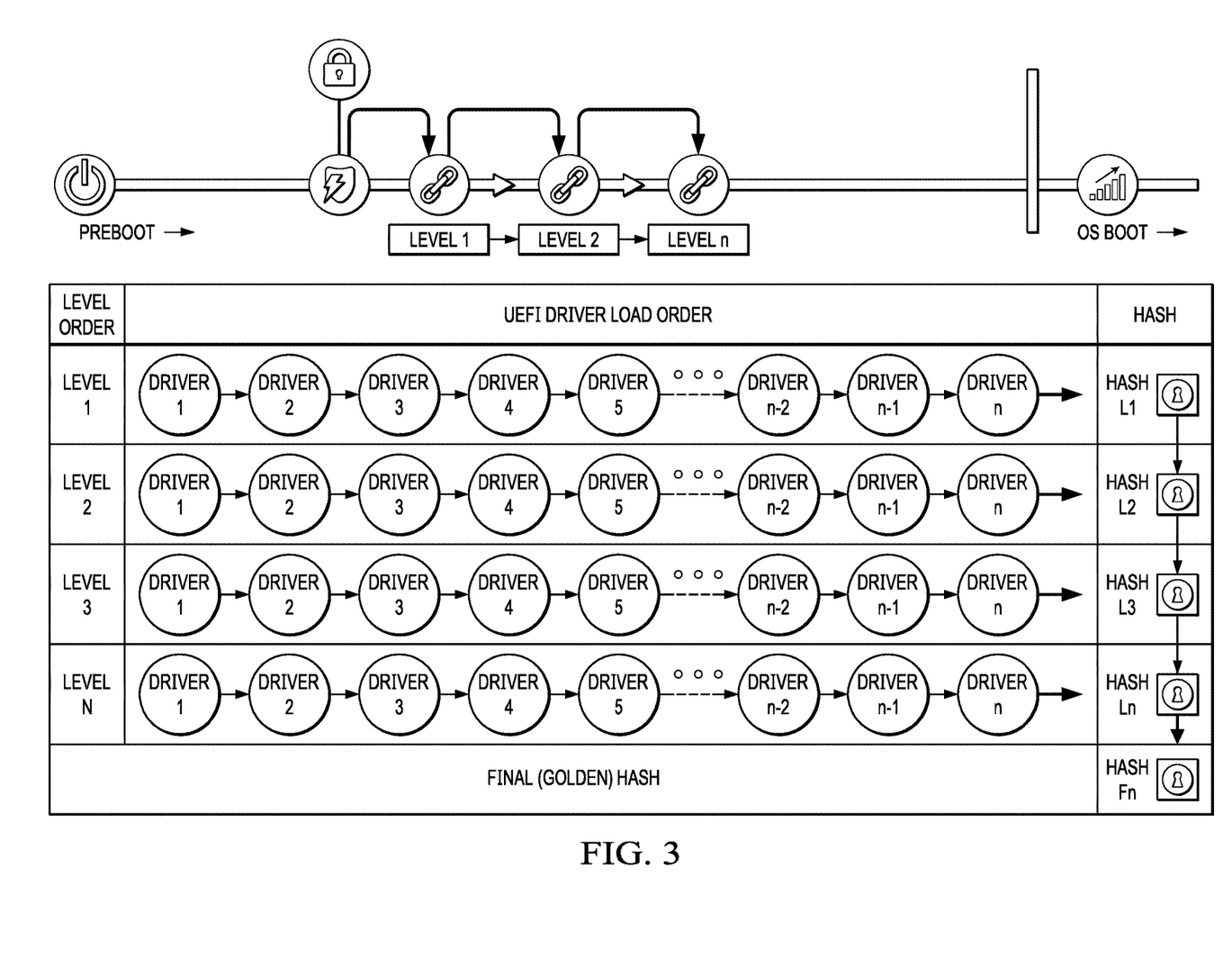
FIG. 3 illustrates a representation of a firmware file load order table, in accordance with embodiments of the present disclosure.

At step 210, the build server may hash each level. At step 212, the build server may hash the collection of hashes for each level again, as a sort of "golden hash." At step 214, the build server may sign the final "golden" hash with a private key associated with information handling system 102 to create firmware file load order table 116. FIG. 3 illustrates a representation of firmware file load order table 116 as created during method 200, in accordance with embodiments of the present disclosure.

At step 216, the build server may securely store firmware file load order table 116, along with a public key associated with the private key used to sign firmware file load order table 116, in computer-readable media (e.g., non-volatile random access memory, Trusted Platform Module, etc.) integral to or otherwise accessible by BIOS 108.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other system such as those shown in FIG. 1 operable to implement method 200. In certain embodiments, method 200 may be implemented partially or fully in software and/or firmware embodied in computer-readable media.

Figure 4:
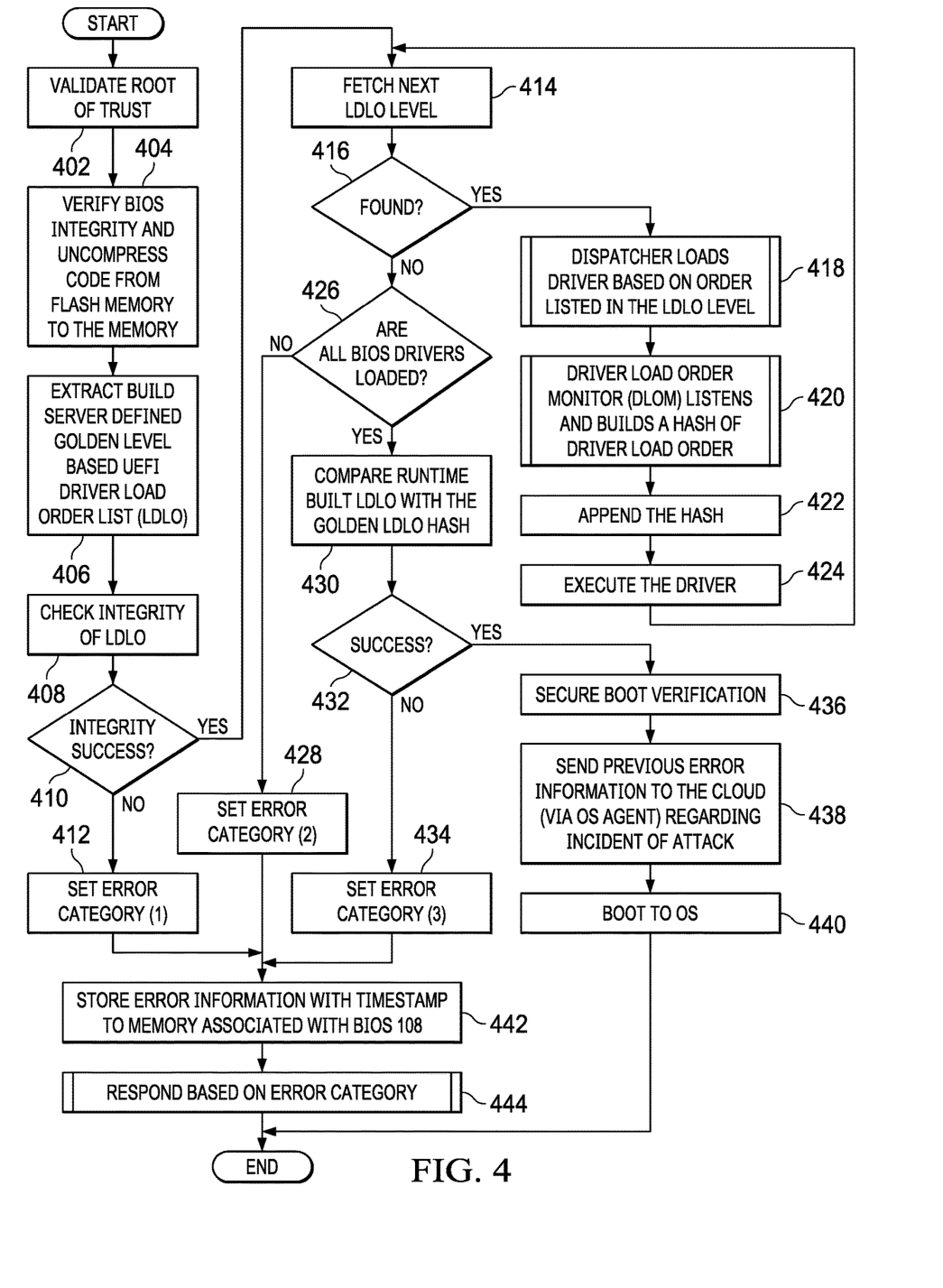
FIG. 4 illustrates a flow chart of an example method for securing and loading BIOS drivers and dependencies in a predefined and measured load order, in accordance with embodiments of the present disclosure.

FIG. 4 illustrates a flow chart of an example method 400 for securing and loading BIOS drivers 112 and dependencies in a predefined and measured load order, in accordance with embodiments of the present disclosure. As noted above, teachings of the present disclosure may be implemented in a variety of configurations of information handling system 102 as shown in FIG. 1. As such, the preferred initialization point for method 400 and the order of the steps comprising method 400 may depend on the implementation chosen. In these and other embodiments, method 400 may be implemented as firmware, software, applications, functions, libraries, or other instructions.

At step 402, a root of trust of BIOS 108 may be validated. Root of trust validation of BIOS is well-known in the art. At step 404, the integrity of BIOS 108 may be verified and BIOS code may be uncompressed from flash memory upon which BIOS 108 is stored and loaded into memory 104 for execution by processor 103. The integrity check and loading of BIOS code that occurs at step 404 is well-known in the art.

At step 406, driver load manager 110 may extract the LDLO defined by the build server from firmware file load order table 116. At step 408, driver load manager 110 may verify the integrity of the LDLO (e.g., by applying a public key associated with the private key used to encrypt the contents of firmware file load order table 116. At step 410, driver load manager 110 may determine if the verification was successful. If the verification was successful, method 400 may proceed to step 414. Otherwise, method 400 may proceed to step 412.

At step 412, driver load manager 110 may set an error category variable to indicate failure of the integrity check of the LDLO (e.g., Error Category (1)). After completion of step 412, method 400 may proceed to step 442.

At step 414, driver load manager 110 may fetch the next LDLO level from the LDLO. At step 416, if a next LDLO level is found (indicating that no LDLOs have been loaded and processed), method 400 may proceed to step 418. Otherwise, method 400 may proceed to step 426.

At step 418, a dispatcher for BIOS 108 may load BIOS drivers 112 based on the order listed in the LDLO level. At step 420, driver load manager 110 may monitor the order of loading and execution for BIOS drivers 112 and build a hash of the order in which BIOS drivers 112 are executed. At step 422, driver load manager 110 may append the hash to the hash created based on monitoring of previously-executed LDLO levels (if any). At step 424, driver load manager 110 may allow execution of the driver(s) from the LDLO level in the order defined by the LDLO level. After completion of step 424, method 400 may proceed again to step 414.

At step 426, driver load manager 110 may determine if all BIOS drivers 112 have been loaded. If all BIOS drivers 112 have been loaded, method 400 may proceed to step 430. Otherwise, method 400 may proceed to step 428.

At step 428, driver load manager 110 may set an error category variable to indicate that not all BIOS drivers 112 have loaded (e.g., Error Category (2)). After completion of step 428, method 400 may proceed to step 442.

At step 430, driver load manager 110 may compare the runtime LDLO hash it has created in the current boot session with the "golden" LDLO hash built by the build server. At step 432, if the runtime LDLO hash matches the golden LDLO hash, method 400 may proceed to step 436. Otherwise, method 400 may proceed to step 434.

At step 434, driver load manager 110 may set an error category variable to indicate that the runtime LDLO hash and the golden LDLO hash do not match (e.g., Error Category (3)). After completion of step 434, method 400 may proceed to step 442.

At step 436, BIOS 108 may perform secure boot verification. At step 438, BIOS 108 may communicate to a remote cloud server (e.g., via an appropriate operating system agent) previous error information generated during a prior execution of method 400, including any incident of attack. At step 440, BIOS 108 may boot to operating system 114. After completion of step 440, method 400 may end.

At step 442, driver load manager 110 may store error information (e.g., including error category) along with a timestamp to a memory associated with BIOS 108. At step 444, driver load manager 110 may respond to the error based on a category of the error. Examples of such a response may include shutting down of information handling system 102, rebooting information handling system 102, booting to a diagnostic operating system of information handling system 102, or performing recovery operations. Examples of recovery operations are restoring a safe configuration of information handling system 102, restoring a safe firmware revision of BIOS 108, or other recovery operation.

After completion of step 444, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, components thereof, or any other system such as those shown in FIG. 1 operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system (BIOS) comprising a program of instructions comprising boot firmware configured to be the first code executed by the processor when the information handling system is booted or powered on, the BIOS configured to, during boot of the information handling system:
   read a predefined measurement of an order of loading of BIOS drivers configured to execute during execution of the BIOS, such predefined measurement made during build of the BIOS wherein the predefined measurement is determined in accordance with content of each BIOS driver and a sequence in which the BIOS drivers were loaded;
   perform a runtime measurement of an order of loading of the BIOS drivers during actual runtime of the information handling system;
   compare the predefined measurement to the runtime measurement; and
   responsive to a mismatch between the predefined measurement and the runtime measurement, respond with a remedial action.

2. The information handling system of claim 1, wherein:
   the predefined measurement is a cryptographic hash of the order of loading of the BIOS drivers during the predefined measurement made during build of the BIOS; and
   the runtime measurement is a cryptographic hash of the order of loading of the BIOS drivers during actual runtime of the information handling system.

3. The information handling system of claim 2, wherein the predefined measurement is a level-based driver load order list, wherein each level represents a particular phase, step, and/or priority of BIOS execution.

4. The information handling system of claim 1, wherein:
   the predefined measurement is signed with a private key; and
   the BIOS is further configured to apply a public key associated with the private key to the predefined measurement.

5. The information handling system of claim 1, wherein the remedial action comprises one of shutting down the information handling system, rebooting the information handling system, booting to a diagnostic operating system of the information handling system, and performing a recovery operation.

6. The information handling system of claim 1, wherein the remedial action comprises one of restoring a safe configuration of the information handling system and restoring a safe firmware revision of the BIOS.

7. A method comprising, in an information handling system comprising a processor and a basic input/output system (BIOS) comprising a program of instructions comprising boot firmware configured to be the first code executed by the processor when the information handling system is booted or powered on, during boot of the information handling system by the BIOS:
   reading a predefined measurement of an order of loading of BIOS drivers configured to execute during execution of the BIOS, such predefined measurement made during build of the BIOS wherein the predefined measurement is determined in accordance with content of each BIOS driver and a sequence in which the BIOS drivers were loaded;
   performing a runtime measurement of an order of loading of the BIOS drivers during actual runtime of the information handling system;
   comparing the predefined measurement to the runtime measurement; and
   responsive to a mismatch between the predefined measurement and the runtime measurement, responding with a remedial action.

8. The method of claim 7, wherein:
   the predefined measurement is a cryptographic hash of the order of loading of the BIOS drivers during the predefined measurement made during build of the BIOS; and
   the runtime measurement is a cryptographic hash of the order of loading of the BIOS drivers during actual runtime of the information handling system.

9. The method of claim 8, wherein the predefined measurement is a level-based driver load order list, wherein each level represents a particular phase, step, and/or priority of BIOS execution.

10. The method of claim 7, wherein:
    the predefined measurement is signed with a private key; and
    the method further comprises applying a public key associated with the private key to the predefined measurement.

11. The method of claim 7, wherein the remedial action comprises one of shutting down the information handling system, rebooting the information handling system, booting to a diagnostic operating system of the information handling system, and performing a recovery operation.

12. The method of claim 7, wherein the remedial action comprises one of restoring a safe configuration of the information handling system and restoring a safe firmware revision of the BIOS.

13. An article of manufacture comprising:
    a non-transitory computer readable medium; and
    computer-executable instructions carried on the non-transitory computer readable medium, the instructions readable by a processor, the instructions, when read and executed, for causing the processor to, in a basic input/output system (BIOS) of an information handling system:
    read a predefined measurement of an order of loading of BIOS drivers configured to execute during execution of the BIOS, such predefined measurement made during build of the BIOS wherein the predefined measurement is determined in accordance with content of each BIOS driver and a sequence in which the BIOS drivers were loaded;
    perform a runtime measurement of an order of loading of the BIOS drivers during actual runtime of the information handling system;

compare the predefined measurement to the runtime measurement; and responsive to a mismatch between the predefined measurement and the runtime measurement, respond with a remedial action.

14. The article of claim 13, wherein:

the predefined measurement is a cryptographic hash of the order of loading of the BIOS drivers during the predefined measurement made during build of the BIOS; and the runtime measurement is a cryptographic hash of the order of loading of the BIOS drivers during actual runtime of the information handling system.

15. The article of claim 14, wherein the predefined measurement is a level-based driver load order list, wherein each level represents a particular phase, step, and/or priority of BIOS execution.

16. The article of claim 13, wherein:

the predefined measurement is signed with a private key; and the instructions are for further causing the processor to apply a public key associated with the private key to the predefined measurement.

17. The article of claim 13, wherein the remedial action comprises one of shutting down the information handling system, rebooting the information handling system, booting to a diagnostic operating system of the information handling system, and performing a recovery operation.

18. The article of claim 13, wherein the remedial action comprises one of restoring a safe configuration of the information handling system and restoring a safe firmware revision of the BIOS.

\* \* \* \* \*